United States Patent [19]
Momiki et al.

[11] Patent Number: 6,097,816
[45] Date of Patent: *Aug. 1, 2000

[54] CRYPT KEY SYSTEM

[75] Inventors: Shunichi Momiki; Makoto Saito, both of Tokyo, Japan

[73] Assignee: Mitsubishi Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/418,195

[22] Filed: Apr. 7, 1995

[30] Foreign Application Priority Data

Apr. 8, 1994 [JP] Japan .................................. 6-070643

[51] Int. Cl.$^7$ .............................. H04L 9/00; H04K 1/00
[52] U.S. Cl. ..................... 380/210; 380/231; 380/239; 380/278
[58] Field of Search ................... 380/21, 10, 20, 380/210, 231, 239, 278

[56] References Cited

U.S. PATENT DOCUMENTS

| | | | |
|---|---|---|---|
| Re. 33,189 | 3/1990 | Lee et al. .................... | 380/20 |
| 4,736,422 | 4/1988 | Mason . | |
| 4,829,569 | 5/1989 | Seth-Smith et al. ............ | 380/10 |
| 4,864,614 | 9/1989 | Ceowther .................... | 380/10 |
| 4,864,615 | 9/1989 | Bennett et al. ............... | 380/21 |
| 4,890,321 | 12/1989 | Seth-Smith et al. ........... | 380/20 |
| 4,995,080 | 2/1991 | Bestler et al. ............... | 380/21 |
| 5,029,207 | 7/1991 | Gammie ...................... | 380/10 |
| 5,091,938 | 2/1992 | Thompson et al. ............. | 380/21 |
| 5,144,663 | 9/1992 | Kudelski et al. . | |
| 5,247,575 | 9/1993 | Sprague et al. .............. | 380/9 |
| 5,341,425 | 8/1994 | Wasilewski et al. ........... | 380/20 |
| 5,504,933 | 4/1996 | Saito ........................ | 455/2 |
| 5,642,418 | 6/1997 | Farris et al. ............... | 380/21 |
| 5,740,246 | 4/1998 | Saito ........................ | 380/21 |

FOREIGN PATENT DOCUMENTS

| | | |
|---|---|---|
| 450841 | 10/1991 | European Pat. Off. . |
| 62-169540 | 7/1987 | Japan . |
| WO8909528 | 10/1989 | WIPO . |

*Primary Examiner*—Pinchus M. Laufer
*Assistant Examiner*—Hrayr A. Sayadian
*Attorney, Agent, or Firm*—Armstrong, Westerman, Hattori, McLeland & Naughton

[57] ABSTRACT

A crypt key system for decrypting encrypted data for use, by a permit key including a decryption key, comprising a database/charging center, a broadcasting station, a receiving device and a communication device. The permit key is supplied to the broadcasting station in advance from the database/charging center. The permit key is broadcast from the broadcasting station. The receiving device receives the permit key via the broadcast. A request for use is executed to the database/charging center via the communication device. The database/charging center transmits the encrypted data via a communication line to the communication device and charges a fee. The communication device decrypts the encrypted data with the permit key received by the receiving device.

19 Claims, 7 Drawing Sheets

CRYPT KEY SYSTEM

BACKGROUND OF THE INVENTION

1. Field of the Invention

The present invention relates to a system for supplying information from a database system or cable television system.

2. Background Art

In the information-oriented society of today, in addition to the existing terrestrial wave broadcasting, the use of satellite broadcasting via broadcasting satellites (BS) or communication satellites (CS) and the use cable television broadcasting (CATV) via coaxial cable or optical fiber cable are becoming widespread.

In CATV, which can distribute programs on several tens of channels at the same time, in addition to unscrambled general channels that viewers can view with a comprehensive subscription, scrambled pay channels such as those for motion pictures, sports, music, etc. are provided that cannot be viewed with the comprehensive subscription. To view these scrambled channels, it is necessary to subscribe for descrambling. However, since the period of subscription is typically about one month, it is not always possible to view the program by request at the desired time.

In order to view live sports programs, motion picture programs or music programs broadcast by scrambled satellite TV broadcasting or CATV channel, there is a system for "per program" viewing, in which a viewing time recorder is installed for each television set. Payment is made according to the record of the actual viewing time. However, such a system entails high cost and labor for control of the system and the collection of fees.

On the other hand, in the information-oriented society of today, a database system is becoming widespread, in which various types of data, independently stored by computers in the past, are utilized by connecting each computer via communication lines.

The information handled so far in such a database system is coded information that contains a relatively small amount of information or picture data, and that can be processed by computer. It is not possible to handle picture data such as that used for natural pictures or animation.

Under such circumstances, techniques have been developed to process picture signals, such as television signals, by compressing and expanding them using computers. As common standards for this purpose, there are JPEG (joint Photographic image coding Experts Group) standards for still pictures, H.261 standards for television conferencing, MPEG1 (Moving Picture image coding Experts Group 1) standards for storing pictures, and MPEG2 standards to cover the current television broadcasting and high definition television broadcasting. As the technique of the future, attention is now focused on "multi-media systems" for simultaneously handling various types of data processed by computers and picture data by digitizing picture signals.

This multi-media system is also incorporated into data communication, and is utilized as one of the data utilities in a database.

With the range of utilization of databases being expanded as described above, handling the charge for utilization of the data on databases becomes an important issue. To reliably charge a fee, it is necessary to provide a system wherein data cannot be used unless the user is a regular subscriber. The best means for this purpose is data encryption.

However, it is necessary to deliver a decrypting key to the user so that the regular user can decrypt the encrypted data and utilize it. Moreover, to ensure that the charging is performed more reliably, it is desirable to change the cryption key for each data selection. It is necessary to deliver a different decrypting key for each data selection. This leads to very troublesome procedures.

To solve the above problems, a system has been proposed by the present inventors in Japanese Patent Application 4-199942 (US-08/098415) and Japanese Patent Application 4-289074 (US08/143912). In these patent applications, it is provided that upon a request for viewing a scrambled program via public telephone line, a charging center transmits a viewing permit code for viewing the scrambled program to a data communication device, and charges and collects a fee. Upon receipt of the viewing permit code, a receiving device descrambles the program according to the viewing permit code, and allows the viewer to view the program. Also, for users utilizing encrypted data requested via public telephone lines, a charging center transmits a use permit code for using encrypted data to a data communication device, and charges and collects the fee. Upon receipt of the use permit code, a receiving device decrypts the encrypted data according to the use permit code, and allows the user to use the data. A device for this purpose is disclosed in Japanese Patent Application 4-276941 (US08/135634) by the present inventors.

In the following, an outline of the invention disclosed in the prior applications will be described.

FIG. 1 shows a charging system for CATV. This charging system comprises CATV station 1, a viewing permit code/ charging control center ("control center 2"), communication device 3 and a tuner/decoder ("receiving device 4"). Dedicated communication line 5 is used for communication between CATV station 1 and control center 2. Communication line 6, such as public telephone line, connects control center 2 and communication device 3. Communication device 3 and receiving device 4 are connected by supply means 7, such as on-line or off-line means using flexible disk. CATV station 1 and receiving device 4 are connected by cable 8, such as coaxial cable or optical fiber cable.

CATV station 1 transmits a scrambled television signal to receiving device 4, and deposits a viewing permit code (a permit key), including data for descrambling the signal, in control center 2 in advance.

Control center 2 transmits a permit key to communication device 3 via communication line 6, in response to a viewer's request for viewing a scrambled television program made using communication device 3, and received across communication line 6. Control center 2 also charges a fee.

The viewer receives the permit key with communication device 3, and sends the permit key to receiving device 4 via supply means 7. Receiving device 4 descrambles the scrambled television program using the permit key. Thus, the viewer can view the requested television program.

In addition to the scrambled television program, the charging system is also applicable to data multiplex broadcasting, which is multiplexed and broadcast on a television broadcasting program or FM audio broadcasting program.

FIG. 2 is a block diagram of a charging system applied to data communication used in a database system.

The charging system comprises data communication host station 9 (such as the database system), control center 10, data communication device 11 and receiving device 12. Data communication host station 9 and control center 10 are connected by dedicated communication line 13. Control center 10 and communication device 11 are connected by communication line 14, e.g. a public telephone line. Communication device 11 and receiving device 12 are connected by appropriate means 15, e.g. direct on-line means or off-line means such as flexible disk. Data communication host station 9 and receiving device 12 are connected by communication line 16, e.g. a public telephone line.

Data communication host station 9 transmits encrypted data to receiving device 12 and deposits, in advance, a use permit code ("a permit key"), including data to be used for decrypting data, at control center 10.

Control center 10 transmits the permit key, in response to a user's request for use of the encrypted data, made via communication line 13 using the communication device 11. Control center 10 also charges a fee.

The user receives the permit key with communication device 11, and sends the permit key to receiving device 12 via supply means 15. Receiving device 12 decrypts the encrypted data using the permit key. Thus, the user who made the request is allowed to use the data.

With the system according to the invention described in the prior applications, it is possible to deliver and receive a permit key, and charge a fee at the same time and in a reliable manner.

However, the request for using data and the transmission of the permit key are executed via general communication lines such as public telephone lines. For this reason, the requests may not be processed adequately when there are too many requests at the same time.

SUMMARY OF THE INVENTION

It is an object of the present invention to provide a crypt key system by which it is possible, in a database or CATV system for charging a fee using a permit key, to process a request for the permit key even when there are too many requests, and not to charge a fee if the received permit key has not been used.

It is further object of the present invention to provide a method for utilizing the crypt key with security and without increasing the cost.

To attain the above objects, the permit key is broadcast via data multiplex broadcasting or data broadcasting.

A user sends a request for use to a database host station. In response to this request for use, the database host station charges a fee and transmits encrypted data. The user decrypts the encrypted data using a received permit key, and uses the data.

A viewer sends a request for viewing a scrambled CATV program to a CATV station. In response to this request, the CATV station charges a fee and transmits the scrambled program. The viewer descrambles the scrambled program using a received permit key, and views the program.

The permit key can be obtained free of charge by data broadcasting, and the fee is charged when the data has been actually used or the program has been actually viewed.

One method for utilizing a crypt key, in which a non-encrypted permit key is broadcast by data broadcasting, and encrypted data or a scrambled picture signal is transmitted from the database host station or CATV station, provides for the encrypted data to be decrypted or the scrambled picture to be descrambled by the non-encrypted permit key broadcast by the data broadcasting. Another method, in which an encrypted permit key is broadcast by data broadcasting, and encrypted data or a scrambled picture signal are transmitted from the database host station or the CATV station, provides for the encrypted permit key to be decrypted by a decryption key incorporated in the equipment used or by a decryption key given in advance, and provides for the data to be decrypted or the picture to be descrambled by the decrypted permit key. A third method, in which an encrypted permit key is broadcast by data broadcasting, encrypted data or a scrambled picture signal are transmitted from the database host station or the CATV station, and a decryption key for decrypting the encrypted permit key is transmitted together with the encrypted data or the scrambled picture from the database host station or the CATV station, provides for the encrypted permit key to be decrypted by the decryption key, and the encrypted data to be decrypted or the scrambled picture to be descrambled by the decrypted permit key.

DETAILED DESCRIPTION

Figure 1:
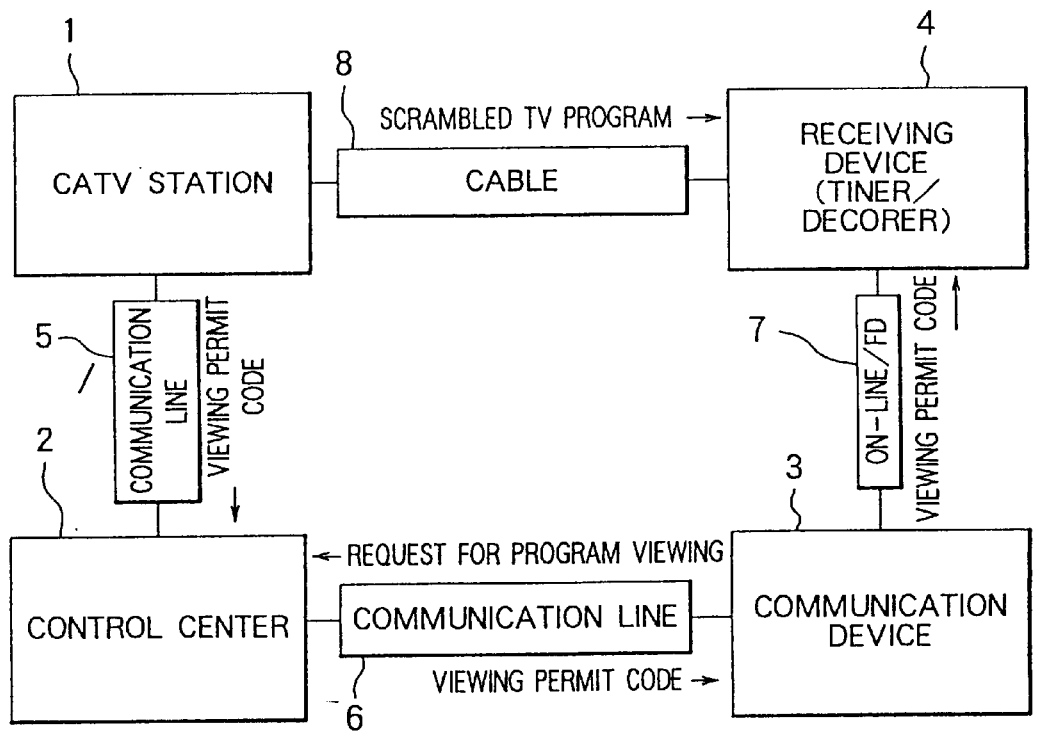
FIG. 1 is a block diagram for a CATV system described in the prior patent applications.
Figure 2:
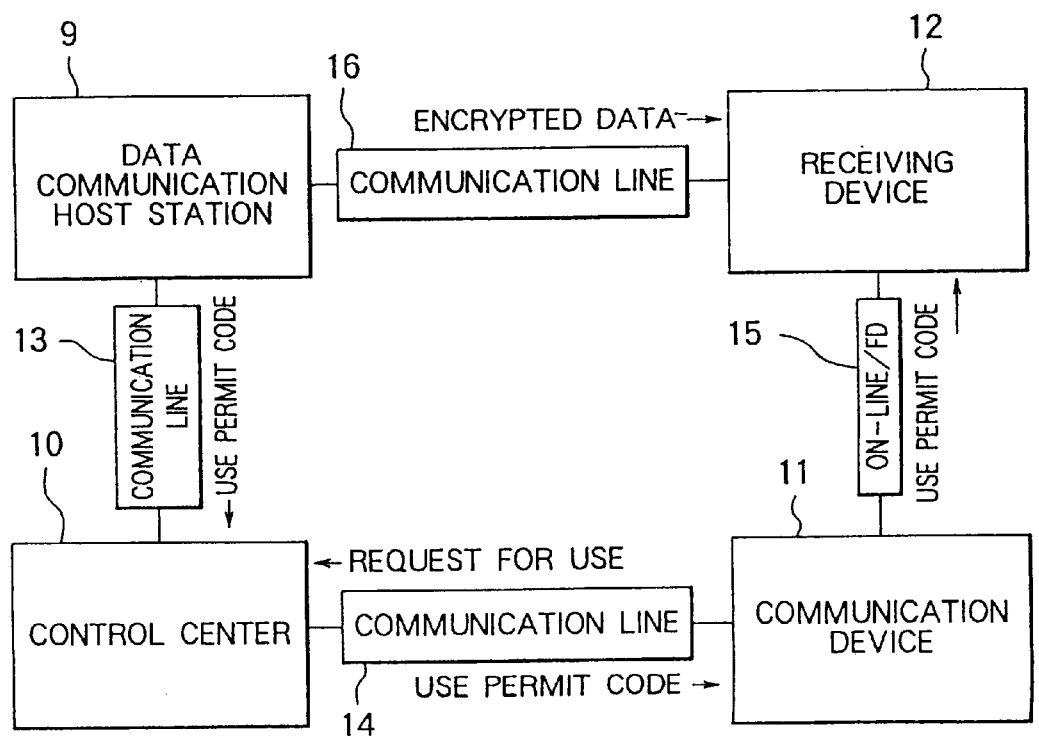
FIG. 2 is a block diagram of a database system described in the prior patent applications.

In the following, description will be given on embodiments of the present invention referring to the drawings.

Figure 3:
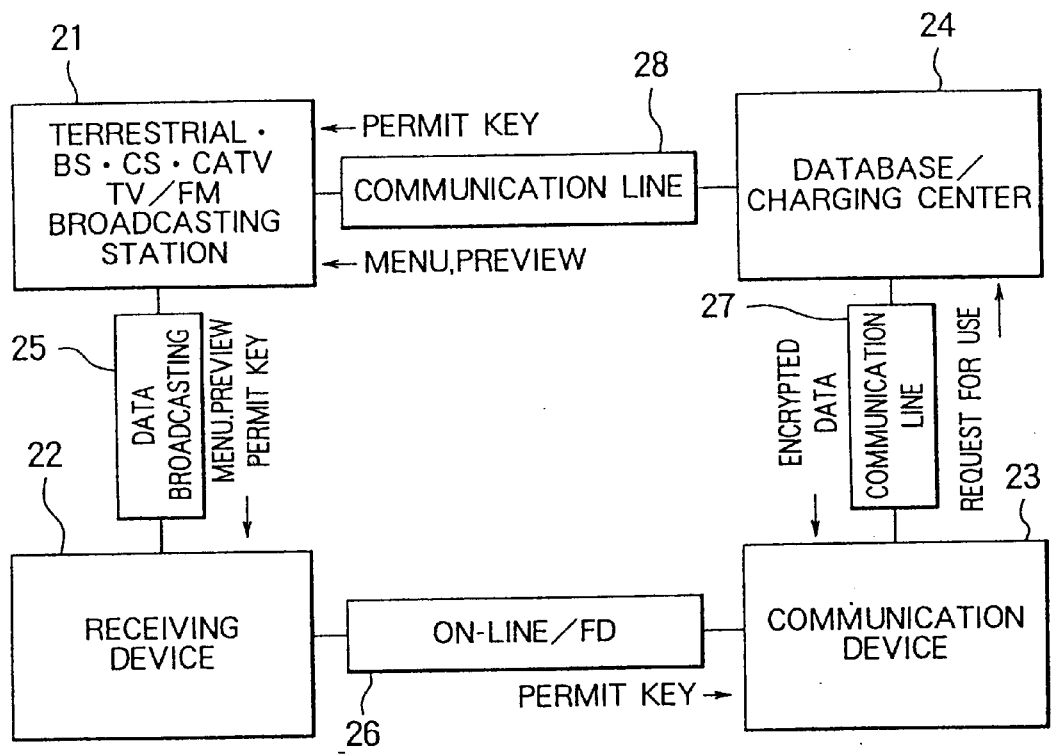
FIG. 3 is a block diagram of a database system, in which the present invention is applied.

FIG. 3 is a block diagram showing the basic construction of a system, in which the present invention is applied to a database.

This system comprises broadcasting station 21 for broadcasting data by BS, CS or terrestrial wave television, by multiplex broadcasting such as FM, or by data broadcasting; database/charging center 24, serving as database and also serving to provide a charging function; receiving device 22 for receiving the broadcast data; and data communication device 23 for carrying out data communication with database/charging center 24.

Broadcasting station 21 and database/charging center 24 are connected by supply means 28, e.g. on-line communication means such as a dedicated communication line or off-line means such as flexible disk. Database/charging center 24 and communication device 23 are connected by communication line 27, e.g. a public telephone line. Broadcasting station 21 and receiving device 22 are connected by broadcasting waves 25. Receiving device 22 and communication device 23 are connected by appropriate supply means 26, e.g. direct on-line means or off-line means such as flexible disk.

In this system, database/charging center 24 supplies a use permit code ("a permit key"), including data for decrypting individual encryption of the requested data, to broadcasting station 21 via supply means 28. For convenience or promotion of data use, a menu showing a table of contents including the titles of the data available or a preview showing brief descriptions of the data selections are also supplied.

Broadcasting station 21 broadcasts the permit key, which may be encrypted or non-encrypted, the menu and the preview as supplied from database/charging center 24.

Upon receipt of the permit key, the menu and the preview broadcast from broadcasting station 21, receiving device 22 sends them to data communication device 23 via supply means 26 directly on an on-line basis, or on an off-line basis after recording them on flexible disk.

A user who wishes to use the data from database 24 sends a request for use to database/charging center 24 via communication line 27 using data communication device 23.

Database/charging center 24 encrypts the data which the user has requested, transmits it to communication device 23, and charges a fee.

Upon receipt of the encrypted data, data communication device 23 decrypts the encrypted data transmitted from database 24, using the permit key sent from receiving device 22.

Figure 4:
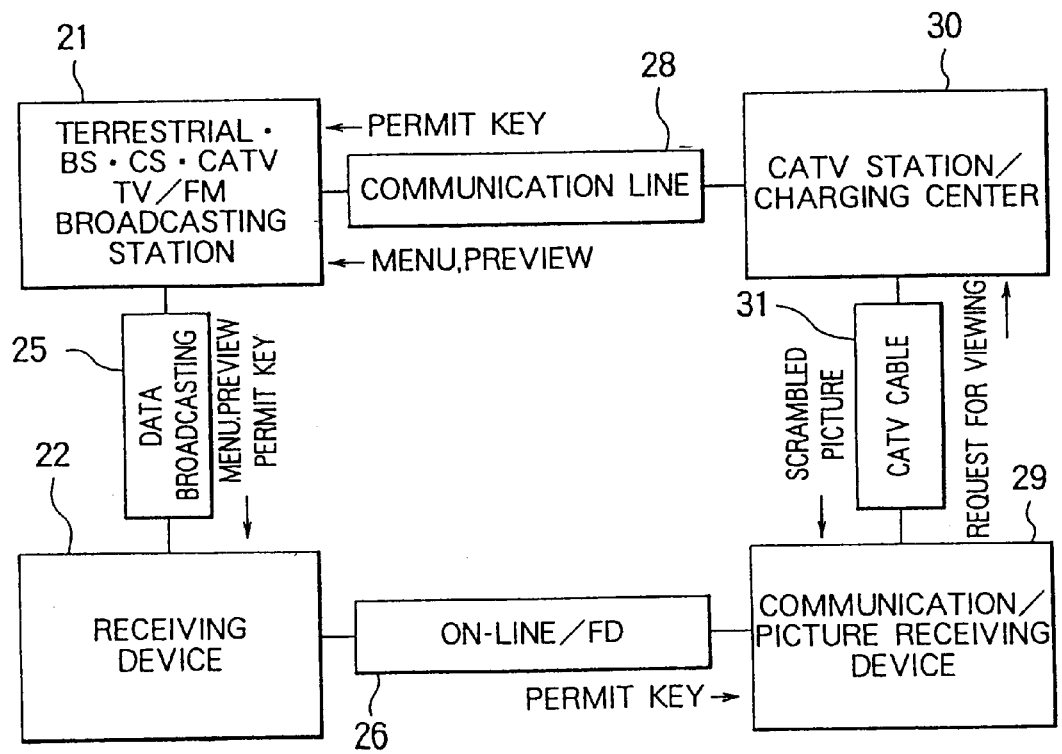
FIG. 4 is a block diagram of a CATV system, in which the present invention is applied.

FIG. 4 is a block diagram of the basic construction of a system, in which the present invention is applied to a CATV system.

This system comprises broadcasting station 21 for broadcasting data by BS, CS, or terrestrial wave television, by multiplex broadcasting such as FM, or by data broadcasting; CATV/charging center 30, serving as a CATV station and also serving to provide a charging function; and communication/picture receiving device 29 for sending viewing requests to CATV/charging center 30, and also for receiving a picture signal from CATV station 30.

Broadcasting station 21 and CATV/charging center 30 are connected by supply means 28, i.e., on-line means such as a dedicated communication line or off-line means such as flexible disk. CATV/charging center 30 and communication/picture receiving device 29 are connected by CATV cable 31. Broadcasting station 21 and receiving device 22 are connected by broadcasting waves 25. Receiving device 22 and communication/picture receiving device 29 are connected by supply means 26, e.g. direct on-line means or off-line means such as flexible disk.

In this system, CATV/charging center 30 supplies a viewing permit code ("a permit key"), including data for descrambling each scrambled program to be supplied, to broadcasting station 21 via supply means 28. In this case, for convenience in viewing, a menu of the programs available including their titles, or a preview introducing the programs such as preliminary announcements, are also supplied in order to promote viewing of the programs.

Broadcasting station 21 broadcasts the permit key, which may be encrypted or non-encrypted, the menu and the preview as supplied from CATV/charging center 30.

Upon receipt of the data broadcast from broadcasting station 21, receiving device 22 supplies the data to the electrically connected communication/picture receiving device 29 via supply means 26.

CATV/charging center 30 scrambles the program and transmits it to communication/picture receiving device 29.

A viewer who wishes to view the program sends a request for viewing of the program to CATV/charging center 30 via a communication line such as a public telephone line or via CATV cable 31 using a communication function of the communication/picture receiving device.

Upon receipt of the viewing request, CATV/charging center 30 charges the fee for viewing the program, and collects the fee.

Communication/picture receiving device 29 receives the scrambled program from CATV station 30, and descrambles it using the permit key supplied from receiving device 22.

If the permit key is duplicated or falsified, use beyond the permitted range can be performed. To prevent such abuse, the number of usage times allotted to the permit key is limited, e.g. to one time or to several times.

In the system described in the prior patent applications, a fee is charged before the permit key is actually used. Thus, inconvenience may arise if the effective period is limited. In contrast, in the invention of the present application, the permit key is available free of charge by the data broadcasting, and the fee is charged when the data is actually used or the program is viewed. Therefore, no inconvenience arises even when the effective period is limited. Previews of television programs currently in practice normally cover one week, and an effective period of about one week may be set for the permit key.

If the permit key is encrypted, it is possible to prevent duplication or falsification of the permit key. However, if the permit key is encrypted, the permit key cannot be used unless it is decrypted.

To decrypt an encrypted permit key, it is necessary to have the key for decryption. In case the number of users of the key is not many, the key can be delivered to them. However, if the number of users is unlimited, as in the system of the present invention, such an approach is not adequate.

For this purpose, a method has been proposed by which the key for decrypting is stored in ROM in the equipment to be used. However, this may lead to an increase of equipment cost, and there is no guarantee that the key is not cryptanalyzed.

In the following, description will be given on a crypt key method which can be used in the crypt key system of the present invention, and which guarantees security with no cost increase.

Figure 5A:
FIGS. 5A, 5B and 5C represent application examples of a crypt key system of the present invention.
Figure 5B:
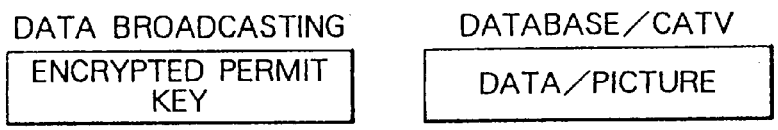
Figure 5C:
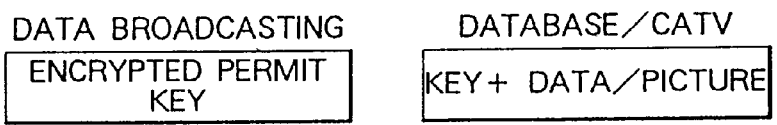

FIGS. 5A, 5B and 5C schematically illustrate a method for using the crypt key of the present invention, in which FIG. 5A represents a method for using the crypt key shown in FIG. 4, and FIGS. 5B and 5C represent methods for using a crypt key without relying on the method of FIG. 4.

In FIG. 5A, a non-crypted permit key is broadcast by data broadcasting, and encrypted data or a scrambled picture signal are transmitted from a database host station or a CATV station. Encrypted data is decrypted or the scrambled picture is descrambled by the non-crypted permit key, which has been broadcast by data broadcasting.

In FIG. 5B, an encrypted permit key is broadcast by data broadcasting, and encrypted data or a scrambled picture signal are transmitted from the database host station or the CATV station. Cryption of the permit key is decrypted by a decryption key incorporated in the equipment or by the decrypting key given in advance. Using the decrypted permit key, the data is decrypted or the picture is descrambled.

The method shown in FIG. 5C is the same as the method shown in FIG. 5B in that the encrypted permit key is broadcast by the data broadcasting and the encrypted data or the scrambled picture signal are transmitted from the database host station or the CATV station. However, in the method shown in FIG. 5C, a decryption key for decrypting the encrypted permit key is transmitted together with the encrypted data or the scrambled picture from the database host station or the CATV station.

The cryption of the permit key is decrypted by the decryption key, and then, this decrypted permit key decrypts the encrypted data or descrambles the scrambled picture.

CATV systems broadcast television programs. Description is now given on how the permit key is transmitted by this broadcasting.

Figure 6:
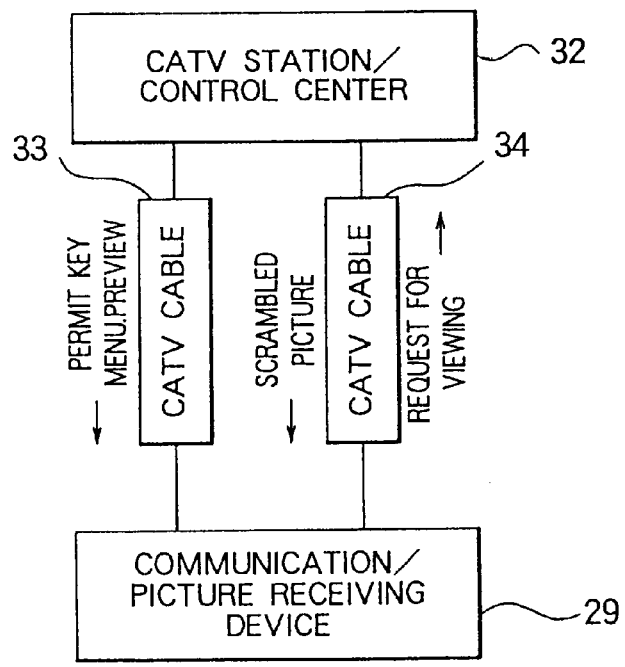
FIG. 6 is a detailed block diagram of a database system, in which the present invention is applied.

The system shown in FIG. 6 comprises CATV station/control center 32, serving as a broadcasting station and also as a CATV/charging center; and a communication/picture receiving device 29, serving also as a receiving device, in contrast to the system shown in FIG. 4, which comprises broadcasting station 21, receiving device 22, CATV/charging center 30 and communication/picture receiving device 29. In FIG. 6, CATV station/control center 32 and communication/picture receiving device 29 are connected only by CATV cables 33 and 34.

In this system, CATV/control center 32 broadcasts a menu of programs and a preview via a data channel of CATV cable 33, together with the permit key, which includes data for descrambling the individual program.

This data broadcast from CATV station/control center 32 is received by communication/picture receiving device 29.

A viewer, who wishes to view the program, sends a request for viewing of the program to CATV station/control center 32 via CATV cable 34 using a communication function of communication/picture receiving device 29.

Upon receipt of the request for viewing, CATV station/control center 32 transmits the scrambled program via CATV cable 34, transmits a permit key via CATV cable 33, and charges a fee for viewing the program.

Upon receipt of the scrambled program, communication/picture receiving device 29 descrambles the requested program using the permit key, which has been broadcast via the data channel.

In FIG. 6, two cables (i.e. CATV cables 33 and 34) are used, yet two-way communication may be performed by the use of a single cable.

In the above, description has been given on a basic arrangement of a system, in which the present invention is applied to a database system or to CATV. Next, description will be given on the details of data broadcasting, as well as how to apply for use of a database, and how to apply for CATV.

In the system, in which the present invention is applied to database, the permit key, menu and preview are broadcast; and in the system, in which the present invention is applied to CATV, the permit key, menu of programs and preview are broadcast, as data broadcasting. This has already been explained in the above description.

When a database is utilized, it is necessary to have information as to which data is contained in the database. For this purpose, it is convenient for the user if a guide on how to use the database and a menu are broadcast together with the permit key. In this case, if a brief description of the content of the data is added, it will be more convenient.

The same applies to the case where the viewer wishes to view CATV. The use of CATV can be promoted if a menu of programs or a preview of the programs is broadcast.

The menu, preview of programs, and brief description of the programs can be broadcast when necessary, yet it would be convenient for the users and the viewers if the menu, preview and brief descriptions are broadcast at the same time as the permit key.

The request for use of a database is executed only by the menu, but the request for viewing a CATV program can be executed by indicating the broadcasting time in addition to the menu of programs.

Description will be given on the details with reference to FIGS. 7 through 14.

Figure 7:
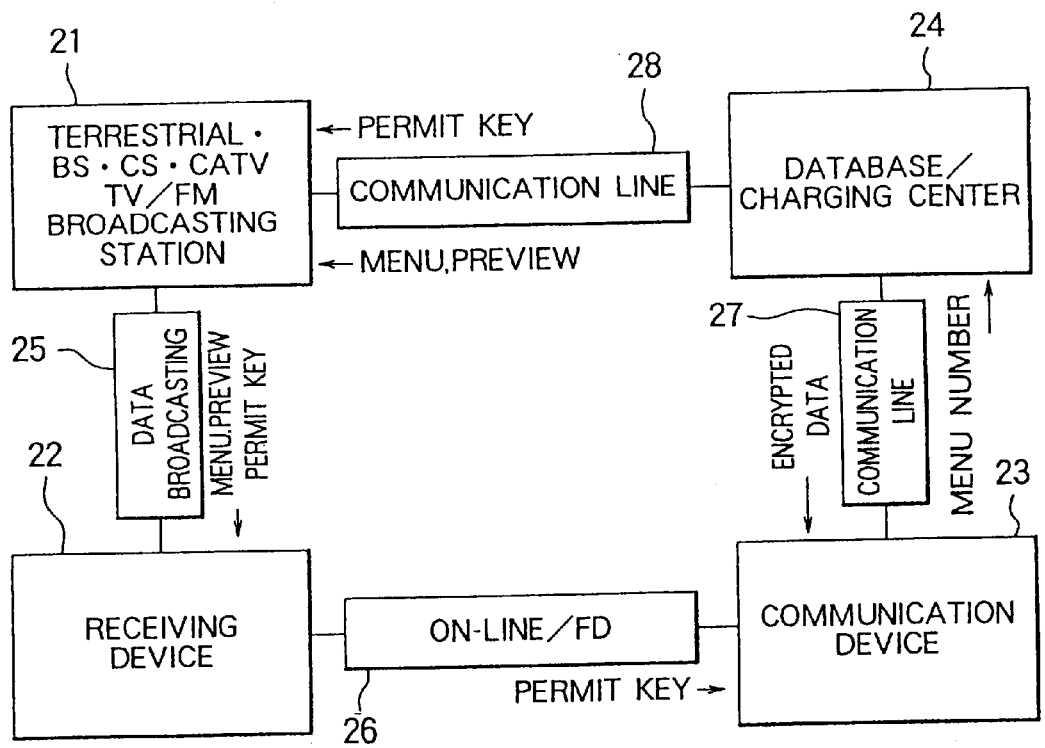
FIG. 7 is a detailed block diagram of another database system, in which the present invention is applied.
Figure 8:
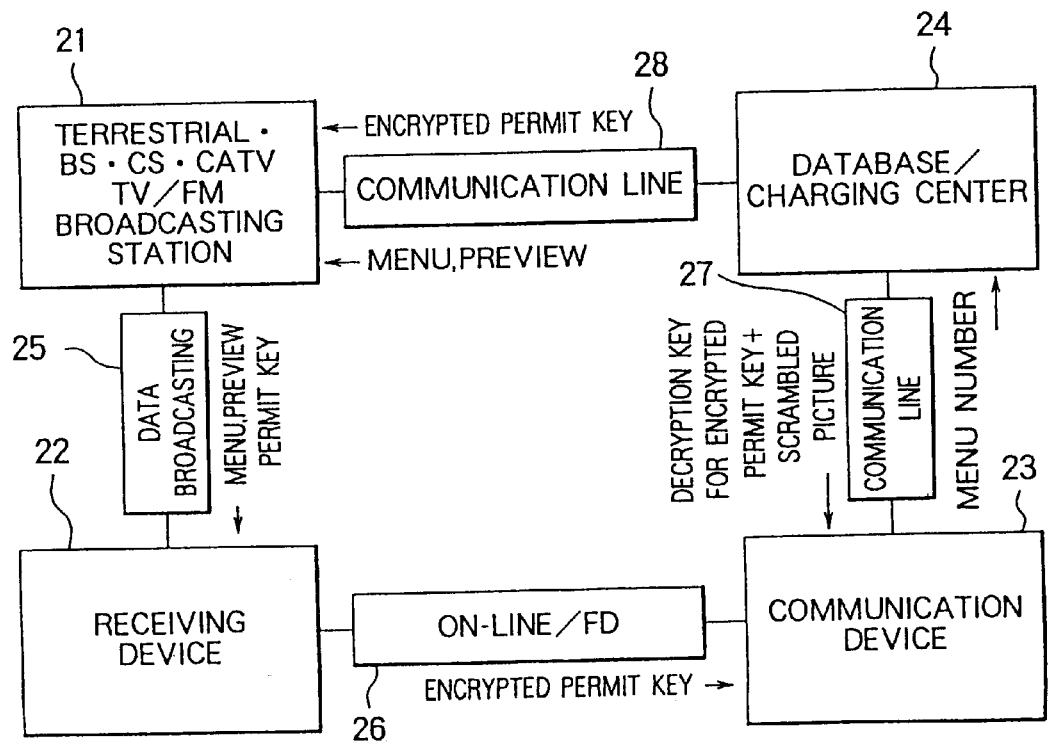
FIG. 8 is a detailed block diagram of a CATV system, in which the present invention is applied.

In these figures, the examples shown in FIG. 7 and FIG. 8 relate to the database, and the examples shown in FIGS. 9 to 14 relate to CATV.

The component elements shown in these figures are the same as those given in FIG. 3 and FIG. 4, and detailed description is not given here.

In the system shown in FIG. 7, in which the present invention is applied to a database, database/charging center 24 supplies a non-crypted permit key, a menu and a preview to broadcasting station 21 in advance.

Broadcasting station 21 broadcasts the permit key, the menu and the preview as supplied from database/charging center 24.

Receiving device 22 receives the permit key, the menu and the preview, and sends them to communication device 23.

A user who wishes to use the data sends a request to database/charging center 24 by indicating the number on the menu using communication device 23.

Database/charging center 24 encrypts the requested data and transmits it to communication device 23, and further charges a fee for data use.

Upon receipt of the encrypted data, communication device 23 decrypts the encrypted data transmitted from the database using the permit key sent from receiving device 22 so that the data will be ready for use.

In the system shown in FIG. 8, in which the present invention is applied to a database, database/charging center 24 supplies an encrypted permit key, a menu and a preview to broadcasting station 21 in advance.

Broadcasting station 21 broadcasts the encrypted permit key, the menu and the preview as supplied from database/charging center 24.

Receiving device 22 supplies the permit key, the menu and the preview to communication device 23.

A user who wishes to use the data sends a request to database/charging center 24 by indicating the number on the menu using communication device 23.

Database/charging center 24 encrypts the data for which a request for use has been made, and transmits it to communication device 23 together with the decryption key for decrypting the encrypted permit key. Database/charging center 24 also charges a fee for use of the data.

Upon receipt of the encrypted data and the decryption key for the encrypted permit key, communication device 23 decrypts the encrypted permit key supplied from receiving device 22 using the decryption key for the encrypted permit key, and further decrypts the encrypted data transmitted from the database using the decrypted permit key so that the data will be ready for use.

Figure 9:
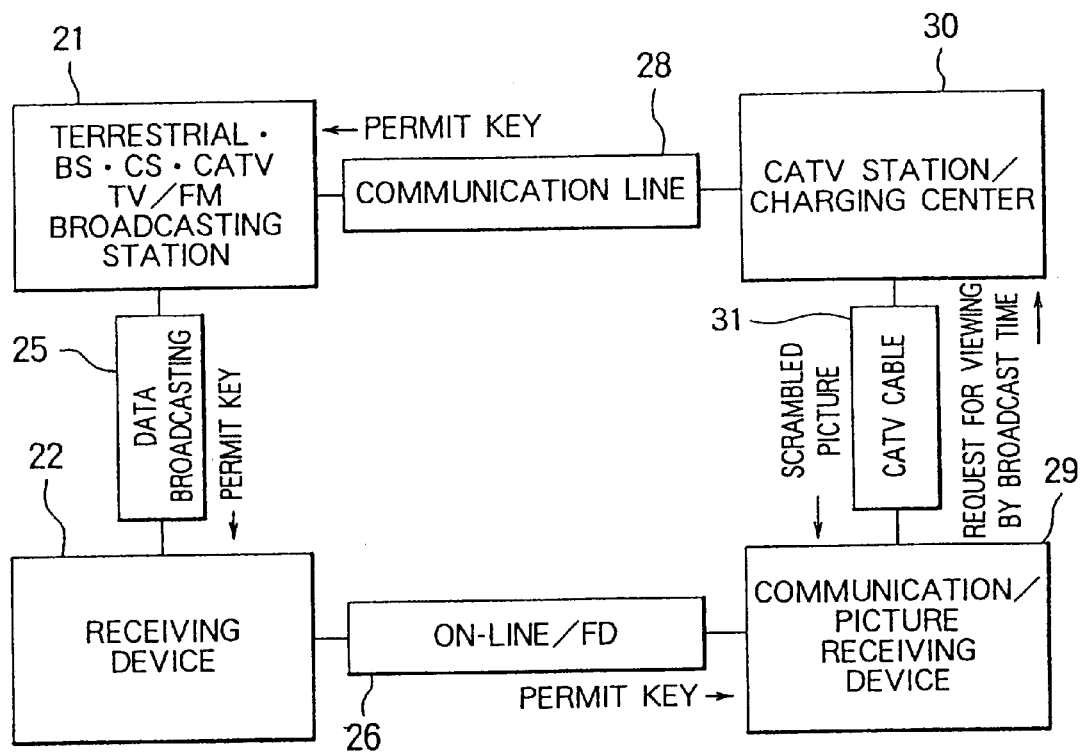
FIG. 9 is a detailed block diagram of another CATV system, in which the present invention is applied.

In the system shown in FIG. 9, in which the present invention is applied to CATV, CATV/charging center 30 supplies a non-crypted permit key to a broadcasting station in advance.

Broadcasting station 21 broadcasts the permit key supplied from CATV/charging center 30.

Receiving device 22 receives the data of the permit key and sends it to communication/picture receiving device 29.

CATV/charging center 30 scrambles the picture of the program and transmits it to communication/picture receiving device 29.

CATV/charging center 30 charges a fee for viewing, when a viewer requests a program for viewing by indicating the broadcasting time using communication/picture receiving device 29.

Upon receipt of the scrambled picture, communication/picture receiving device 29 descrambles the scrambled picture transmitted from CATV/charging center 30 using the permit key sent from the receiving device 22.

Figure 10:
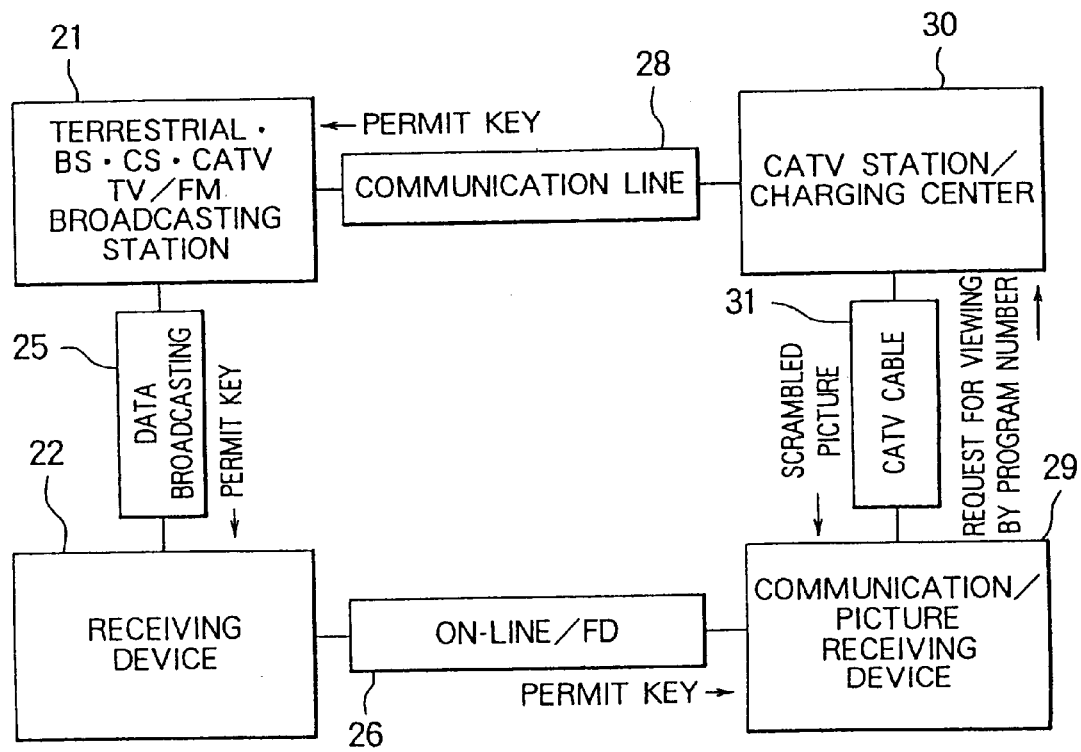
FIG. 10 is a detailed block diagram of another CATV system, in which the present invention is applied.

In the system shown in FIG. 10, in which the present invention is applied to CATV, CATV/charging center 30 supplies a non-crypted permit key to broadcasting station 21 in advance.

Broadcasting station 21 broadcasts the permit key supplied from CATV/charging center 30.

Receiving device 22 sends the data of the permit key to communication/picture receiving device 29.

CATV/charging center 30 scrambles the picture of the program and transmits it to communication/picture receiving device 29.

CATV/charging center 30 charges a fee for viewing, when a viewer requests a program for viewing by indicating the number of the program using communication/picture receiving device 29.

Upon receipt of the scrambled picture, communication/picture receiving device 29 descrambles the scrambled picture transmitted from CATV/charging center 30 using the permit key supplied from receiving device 22 so that the picture will be ready for viewing.

Figure 11:
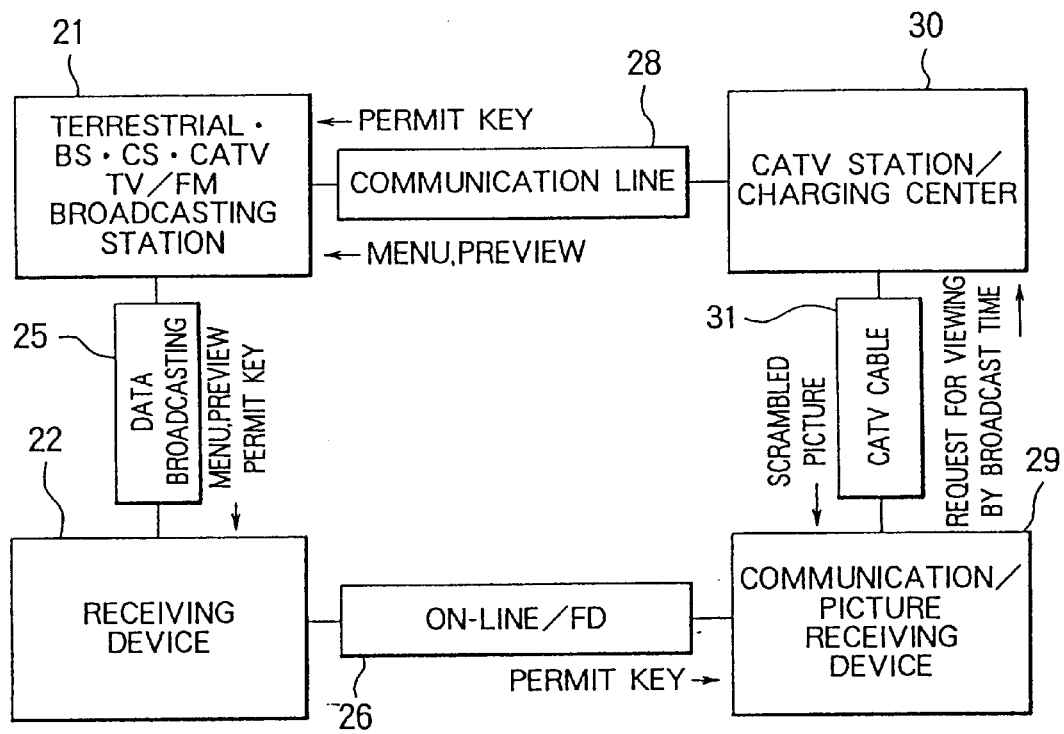
FIG. 11 is a detailed block diagram of another CATV system, in which the present invention is applied.

In the system shown in FIG. 11, in which the present invention is applied to CATV, CATV/charging center 30 supplies a menu of the programs and a preview, together with a non-crypted permit key, to broadcasting station 21 in advance.

Broadcasting station 21 broadcasts the permit key, the menu and the preview supplied from CATV/charging center 30.

Receiving device 22 sends the received permit key, the menu and the preview to communication/picture receiving device 29.

CATV/charging center 30 scrambles the picture of the program, and transmits it to communication/picture receiving device 29.

CATV/charging center 30 charges a fee for viewing, when a viewer requests a program for viewing by indicating the broadcasting time using communication/picture receiving device 29.

Upon receipt of the scrambled picture, communication/picture receiving device 29 descrambles the scrambled pictures transmitted from CATV/charging center 30, using the permit key sent from receiving device 22, so that the picture will be ready for viewing.

Figure 12:
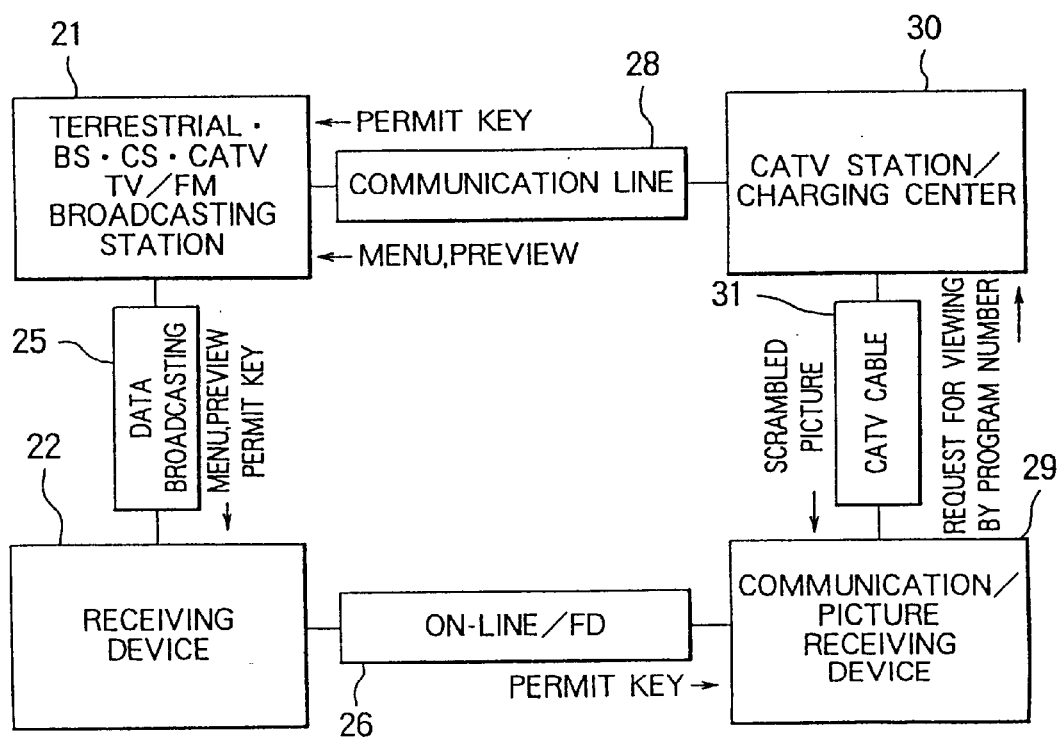
FIG. 12 is a detailed block diagram of another CATV system, in which the present invention is applied.

In the system shown in FIG. 12, in which the present invention is applied to CATV, CATV/charging center 30 supplies a menu of programs and a preview, together with a non-crypted permit key, to broadcasting station 21 in advance.

Broadcasting station 21 broadcasts the menu and the preview together with the permit key supplied from CATV/charging center 30.

Receiving device 22 sends the received permit key, the menu and the preview to communication/picture receiving device 29.

CATV/charging center 30 scrambles the picture of the program and transmits it to communication/picture receiving device 29.

CATV/charging center 30 charges a fee for viewing, when a viewer requests a program for viewing by indicating the number of the program using communication/picture receiving device 29.

Upon receipt of the scrambled picture, communication/picture receiving device 29 descrambles the scrambled picture transmitted from CATV/charging center 30, using the permit key supplied from the receiving device 22, so that the picture will be ready for viewing.

Figure 13:
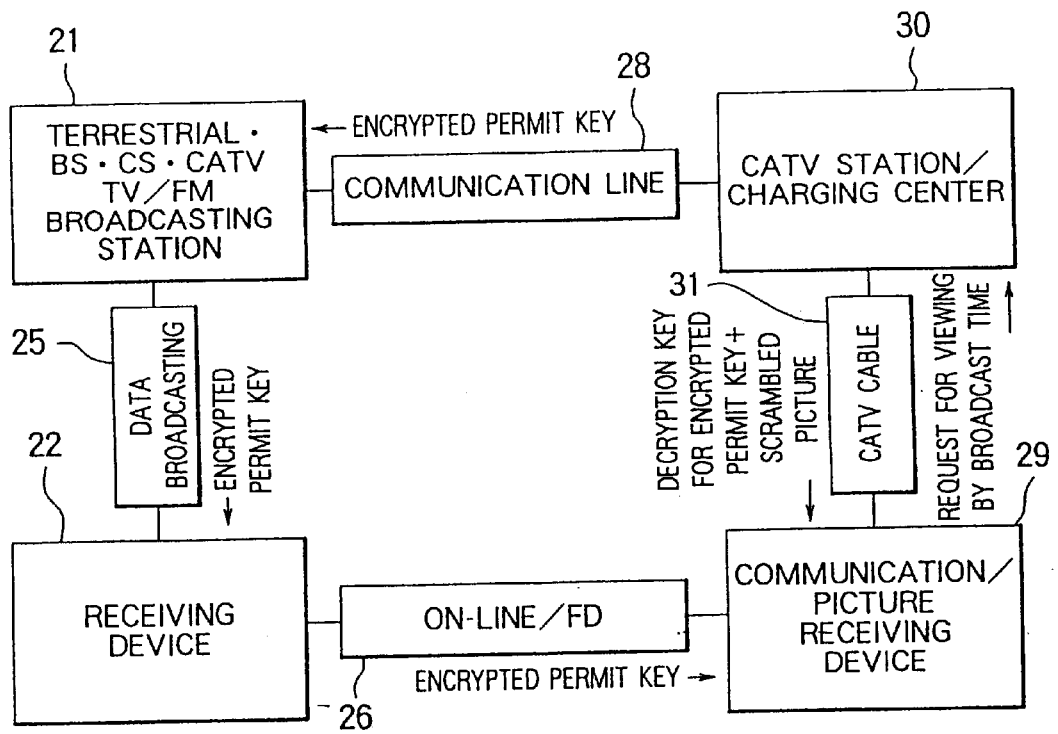
FIG. 13 is a detailed block diagram of another CATV system, in which the present invention is applied.

In the system shown in FIG. 13, in which the present invention is applied to CATV, CATV/charging center 30 supplies a menu of programs and a preview, together with an encrypted permit key, to broadcasting station 21 in advance.

In this system, the menu and the preview are not necessarily needed and these may not be supplied.

Broadcasting station 21 broadcasts the encrypted permit key, the menu and the preview supplied from CATV/charging center 30.

Receiving device 22 supplies the received encrypted permit key, the menu and the preview to communication/picture receiving device 29.

CATV/charging center 30 transmits a key for decrypting the encrypted permit key together with the scrambled picture of programs to communication/picture receiving device 29.

CATV/charging center 30 charges a fee for viewing, when a viewer requests a program for viewing by indicating the broadcasting time using communication/picture receiving device 29.

Upon receipt of the scrambled picture and the key, communication/picture receiving device 29 decrypts the encrypted permit key supplied from receiving device 22 using the received key, and then descrambles the scrambled picture transmitted from CATV/charging center 30 using the decrypted permit key so that the picture will be ready for viewing.

Figure 14:
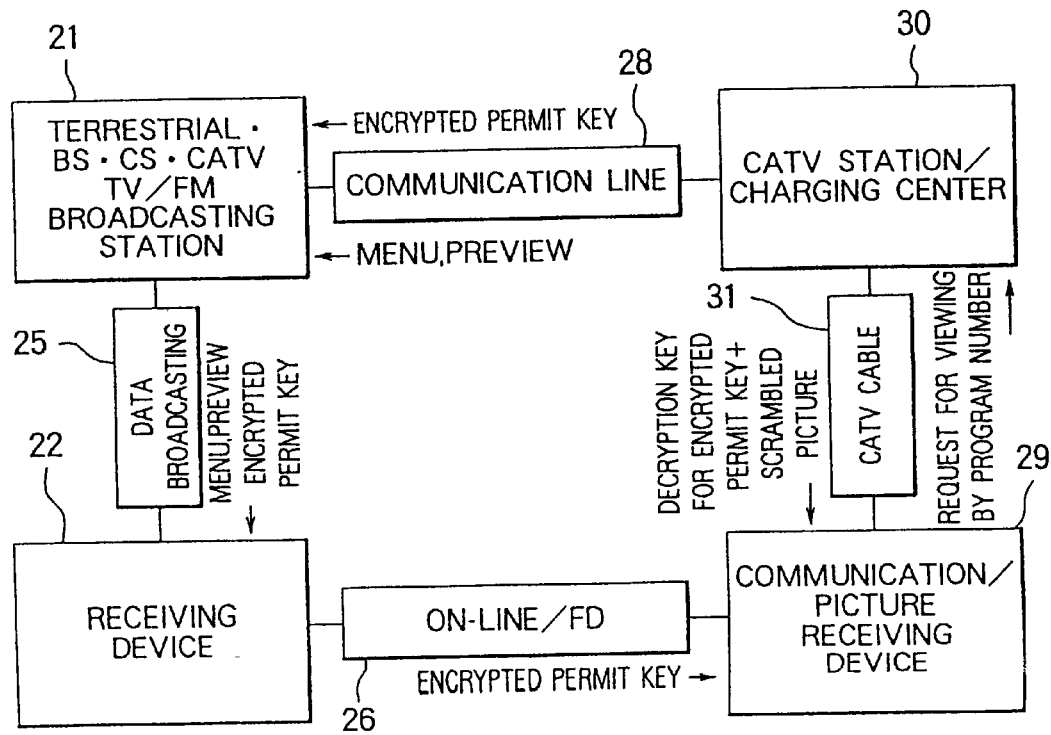
FIG. 14 is a detailed block diagram of another CATV system, in which the present invention is applied.

In the system shown in FIG. 14, in which the present invention is applied to CATV, CATV/charging center 30 supplies a menu of programs and a preview, together with an encrypted permit key, to broadcasting station 21 in advance.

In this system, the menu and the preview are not necessarily needed, but it is preferable that they are supplied for the convenience of a viewer.

Broadcasting station 21 broadcasts the encrypted permit key, the menu and the preview supplied from CATV/charging center 30.

Receiving device 22 supplies the encrypted permit key to communication/picture receiving device 29.

CATV/charging center 30 transmits a key for decrypting the encrypted permit key together with the scrambled picture of the desired program to communication/picture receiving device 29.

CATV/charging center 30 charges a fee for viewing, when a viewer requests a program for viewing by indicating the program number of the desired program using communication/picture receiving device 29.

Upon receipt of the scrambled pictures and the key, communication/picture receiving device 29 decrypts the encrypted permit key supplied from receiving device 22 using the received key, and descrambles the scrambled picture transmitted from CATV/charging center 30 using the decrypted permit key so that the picture will be ready for viewing.

What we claim is:

1. A method in a crypt key system for decrypting encrypted data for use, by a permit key including a decryption key, comprising a database/charging center, a broadcasting station, a receiving device and a communication device, the method comprising the steps of:
   said permit key is supplied to said broadcasting station in advance from said database/charging center;
   said permit key is broadcast from said broadcasting station;
   said receiving device receives said permit key via said broadcast;
   a request for use is received by said database/charging center from said communication device;
   upon receiving said request for use, said database/charging center transmits the encrypted data via a communication line only to said communication device that sent the request for use and charges a fee; and
   said communication device decrypts said encrypted data received via said communication line with said permit key received by said receiving device via said broadcast.

2. A method in a crypt key system according to claim 1, wherein said permit key is not encrypted.

3. A method in a crypt key system according to claim 1, wherein said permit key is encrypted.

4. A method in a crypt key system for decrypting encrypted data by a permit key including a decryption key, comprising a database/charging center, a broadcasting station, a receiving device and a communication device, the method comprising the steps of:
   said permit key, a menu and a preview are supplied to said broadcasting station in advance from said database/charging center;
   said permit key, said menu and said preview are broadcast from said broadcasting station;
   said receiving device receives said permit key, said menu and said preview via said broadcast;
   a request for use is sent to said database/charging center from said communication device;
   upon receiving said request for use, said database/charging center transmits the encrypted data via a communication line only to said communication device that sent the request for use and charges a fee; and
   said communication device decrypts said encrypted data received via said communication line by said permit key received by said receiving device via said broadcast.

5. A method in a crypt key system according to claim 4, wherein said permit key is not encrypted.

6. A method in a crypt key system according to claim 4, wherein said permit key is encrypted.

7. A method in a crypt key system for descrambling a scrambled picture signal for viewing using a viewing permit key including a key for descrambling, comprising a CATV/charging center, a broadcasting station, a receiving device and a communication/picture receiving device, the method comprising the steps of:
   said viewing permit key is supplied in advance to said broadcasting station from said CATV/charging center:
   said viewing permit key is broadcast from said broadcasting station;
   said receiving device receives said viewing permit key via said broadcast;
   a request for viewing is sent to said CATV/charging center from said communication/picture receiving device;
   upon receiving said request for viewing, said CATV/charging center transmits the scrambled picture signal via a communication line only to said communication/picture receiving device from which said request for viewing was sent and charges a fee; and
   said communication/picture receiving device descrambles said scrambled picture signal for viewing using said viewing permit key received by said receiving device.

8. A method in a crypt key system according to claim 7, wherein said viewing permit key is not encrypted.

9. A method in a crypt key system according to claim 7, wherein said viewing permit key is encrypted.

10. A method of in a crypt key system for descrambling a scrambled picture signal for viewing using a viewing permit key including a key for descrambling, comprising a CATV/charging center, a broadcasting station, a receiving device and a communication/picture receiving device, the method comprising the steps of:
    said viewing permit key, a menu of programs, and a preview are supplied to said broadcasting station in advance from said CATV/charging center;
    said viewing permit key, said menu and said preview are broadcast from said broadcasting station;
    said receiving device receives said viewing permit key, said menu and said preview via said broadcast;
    a request for viewing is sent to said CATV/charging center by said communication/picture receiving device;
    upon receiving said request for viewing, said CATV/charging center transmits the scrambled picture signal via a communication line only to said communication/picture receiving device that sent the request for viewing and charges a fee; and
    said communication/picture receiving device descrambles said scrambled picture signal received via said communication line using said viewing permit key received by said receiving device via said broadcast.

11. A method in a crypt key system according to claim 10, wherein said viewing permit key is not encrypted.

12. A method in a crypt key system according to claim 10, wherein said viewing permit key is encrypted.

13. A method in a crypt key system for descrambling a scrambled picture signal for viewing using a viewing permit key including a key for descrambling, comprising a CATV/control center and a communication/picture receiving device; the method comprising the steps of:
    said viewing permit key, a menu of programs, and a preview are supplied to said communication/picture receiving device in advance from said CATV/control center;
    a request for viewing is executed to said CATV/control center via said communication/picture receiving device;
    said CATV/control center transmits the scrambled picture signal only to said communication/picture receiving device and charges a fee; and
    said communication/picture receiving device descrambles said scrambled picture signal for viewing using said received viewing permit key.

14. A method in a crypt key system according to claim 13, wherein the supply of the viewing permit key, the menu of programs and the preview from said CATV/control center to said communication/picture receiving device is executed via a first CATV cable, and the request for viewing from said communication/picture receiving device to said CATV/control center and transmission of the scrambled picture signal from said CATV/control center to said communication/picture receiving device are executed via a second CATV cable.

15. A method in a crypt key system according to claim 13, wherein the supply of the viewing permit key, the menu of programs and the preview from said CATV/control center to said communication/picture receiving device, the request for viewing from said communication/picture receiving device to said CATV/control center, and transmission of the scrambled picture signal from said CATV/control center to said communication/picture receiving device are executed by a single CATV cable.

16. A method in a crypt key system for decrypting encrypted data for use by a permit key including a decryption key, the method comprising the steps of:

an encrypted permit key is broadcast;

said host station receives a request for use of said data from a user;

upon receiving said request for use, said encrypted data is transmitted from a database host station only to said user via a communication line;

said encrypted permit key is decrypted by a key for decrypting, which is delivered in advance; and said encrypted data received via said communication line is decrypted by said decrypted permit key received via said broadcast.

17. A method in a crypt key system for descrambling a scrambled picture for viewing by a permit key including a key for descrambling, the method comprising the steps of:

an encrypted permit key is broadcast;

a CATV station receives a request for viewing said picture from a user;

upon receiving said request for use, said scrambled picture is transmitted from said CATV station only to said user via a communication line;

said encrypted permit key is decrypted by a key for decryption, which is delivered in advance; and said scrambled picture received via said communication line is descrambled by said decrypted permit key received via said broadcast.

18. A method in a crypt key system for decrypting encrypted data for use by a permit key including a decryption key, the method comprising the steps of:

an encrypted permit key is broadcast; request for use is received by a database host station from a user; upon receiving said request for use, a key for decrypting said encrypted permit key is transmitted together with said encrypted data from the database host station only to said user;

said encrypted permit key is decrypted by said key for decrypting; and said encrypted data is decrypted by said decrypted permit key.

19. A method in a crypt key system for descrambling a scrambled picture for viewing by a permit key including a key for descrambling, the method comprising the steps of:

an encrypted permit key is broadcast; request for use is received by a CATV station from a user; upon receiving said request for use, a key for decrypting said encrypted permit key is transmitted together with said scrambled picture from the CATV station only to said user;

said encrypted permit key is decrypted by said key for decrypting; and said scrambled picture is descrambled by said decrypted permit key.

* * * * *

UNITED STATES PATENT AND TRADEMARK OFFICE
CERTIFICATE OF CORRECTION

PATENT NO. : 6,097,816
DATED : August 1, 2000
INVENTOR(S) : Saito

It is certified that error appears in the above-identified patent and that said Letters Patent is hereby corrected as shown below:

<u>Title page,</u>
Heading, change "Momiki et al." to -- Saito --.

Item [75], change "Shunichi Momiki; Makoto Saito, both" to -- Makoto Saito, --.

Signed and Sealed this

Thirteenth Day of November, 2001

*Attest:*

*Nicholas P. Godici*

*Attesting Officer*

NICHOLAS P. GODICI
*Acting Director of the United States Patent and Trademark Office*